Patented Feb. 23, 1937

2,071,917

UNITED STATES PATENT OFFICE 2,071,917

PROCESS OF PREPARING N-ALKOXYALKYL ARYL SULPHONAMIDES

Bozetech C. Bren, Cedar Grove, N. J., assignor, by mesne assignments, to E. I. du Pont de Nemours & Company, Wilmington, Del., a corporation of Delaware No Drawing. Original application February 28, 1934, Serial No. 713,375. Divided and this application June 12, 1935, Serial No. 26,247. In Canada February 18, 1935

6 Claims. (Cl. 260—128)

This invention relates to the preparation of new compounds and, more particularly, relates to a process of preparing sulphonamides having high boiling points. This application is a division of applicant's copending application Serial No. 713,375, filed February 28, 1934, entitled "New compound and compositions containing same" issued on February 18, 1936, as United States Letters Patent No. 2,031,206.

An object of the present invention is to provide an economical process of preparing derivatives of aryl sulphonamides. Other objects of the invention will be apparent from the description given hereinafter.

The above objects are accomplished according to the present invention by reacting an aryl sulphonamide with an alkoxyalkyl halide in the presence of an alkali to form a N-alkoxyalkyl aryl sulphonamide. More specifically, the present invention comprises carrying out the reaction in an aqueous medium and in the presence of sodium hydroxide.

The following examples are given to illustrate the preparation of N-alkoxyalkyl aryl sulphonamides according to the present invention:

*Example 1.*—Methoxypropyl p-toluene sulphonamide:—A mixture containing 171 g. p-toluene sulphonamide, 200 g. water and 40 g. sodium hydroxide was heated to 80° under a reflux condenser. One hundred twenty grams gamma-methoxypropyl chloride were slowly added, and the mixture was refluxed for 30 hours. The methoxypropyl chloride slowly reacted with the sodium p-toluene sulphonamide. The oily product was dissolved in dilute sodium hydroxide solution, decolorized, filtered and acidified with hydrochloric acid. The precipitated product, which is a solid when cold, was filtered off and air dried.

*Example 2.*—Di-methoxyethyl p-toluene sulphonamide:—Mono-methoxyethyl p-toluene sulphonamide was prepared by the method outlined in Example 1. To convert this to di-methoxyethyl p-toluene sulphonamide, 230 g. were dissolved in 500 cc. of water containing 40 g. sodium hydroxide. To this mixture was added 110 g. methoxyethyl chloride and the mixture was then refluxed under a condenser for 30–40 hours. The oily layer which separated consisted mainly of di-methoxyethyl p-toluene sulphonamide. It was washed with dilute sodium hydroxide solution to remove any of the mono derivative and was then heated to 130°/50 mm. vacuum to remove any volatile material. The remaining product was treated with decolorizing carbon and filtered. A pale yellow oil resulted.

*Example 3.*—Bis-p-toluene sulphonamide-diethyl ether:—A mixture containing 342 g. p-toluene sulphonamide, 80 g. sodium hydroxide, 126 g. BB' di-chlorodiethyl ether, and 500 g. water was refluxed for 30–40 hours. The product separated as an insoluble solid. This material was separated, extracted several times with hot water, and finally crystallized from benzene.

As will be understood by those skilled in this art, the method of preparation as illustrated by the above examples may be varied widely and the proportion of reactants may be either equimolecular or there may be an excess of either reactant.

In place of the alkoxyalkyl halides employed in the above examples, other halides of this class may be employed such as methoxybutyl chloride, ethoxyethyl chloride, butoxyethyl chloride, ethoxyethoxyethyl chloride, and the corresponding bromides, iodides, and the like. Likewise, other aryl sulphonamides may be used such as benzene, monochlorobenzene, dichlorobenzene, xylene, naphthalene, tetrahydronaphthalene, and chloronaphthalene sulphonamides.

The compounds adapted to be prepared according to the process of the present invention, namely, the N-alkoxyalkyl aryl sulphonamides, may be represented by the following formula:

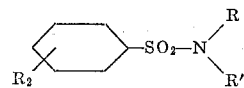

in which R represents an alkoxyalkyl radical, R' an alkoxyalkyl radical, an alkyl radical, or hydrogen, and $R_2$ a hydrocarbon radical, halogen, methoxy, ethoxy, and the like. When $R_2$ is a hydrocarbon radical it may be divalent and $R_2$ may be substituted in either ortho, meta, or para positions.

The aryl sulphonamides of the class herein described vary in physical properties from substantially colorless, oily liquids to white, crystalline solids and they are characterized by extremely high boiling points and low vapor pressures, as well as their high compatibility with cellulose derivatives. They are uniformly characterized by being more compatible with cellulose acetate than the usual alkyl substituted aryl sulphonamides heretofore known and because of this characteristic are of commercial value as plasticizers in various coating and plastic compositions. These compounds are soluble in the ordinary organic solvents and are miscible to an exceptional degree with other materials commonly used as plasticizers in the various plastics used commercially. These compounds are further characterized by their compatibility with various natural and synthetic resins, such as polyvinyl acetate, polymerized methyl methacrylate, polystyrene, polyhydric alcohol-polybasic acid resins, phenol aldehyde resins, and the various modified phenol aldehyde resins known in the art, and many natural resins, such as damar, pontianac, kauri, elemi, shellac, and the like. Many of these compounds are also compatible with rubber and rubber derivatives.

As many apparently widely different embodiments of this invention may be made without departing from the spirit and scope thereof, it is to be understood that the invention is not limited to the specific embodiments thereof except as defined in the appended claims.

I claim:

1. Process of preparing a N-alkoxyalkyl aryl sulphonamide comprising reacting an aryl sulphonamide with an alkoxyalkyl halide in the presence of an alkali metal hydroxide.

2. Process of preparing a N-alkoxyalkyl aryl sulphonamide comprising heating under a reflux condenser in an aqueous medium an aryl sulphonamide and an alkoxyalkyl halide in the presence of an alkali metal hydroxide.

3. Process of preparing a N-alkoxyalkyl aryl sulphonamide comprising reacting in an aqueous medium an aryl sulphonamide with an alkoxyalkyl halide in the presence of sodium hydroxide.

4. Process of preparing a N-methoxyethyl p-toluene sulphonamide comprising reacting p-toluene sulphonamide with methoxyethyl chloride in the presence of an alkali metal hydroxide.

5. Process of preparing a N-methoxyethyl p-toluene sulphonamide comprising heating under a reflux condenser in an aqueous medium p-toluene sulphonamide and methoxyethyl chloride in the presence of an alkali metal hydroxide.

6. Process of preparing a N-methoxyethyl p-toluene sulphonamide comprising reacting in an aqueous medium p-toluene sulphonamide with methoxyethyl chloride in the presence of sodium hydroxide.

BOZETECH C. BREN.